US010651639B2

(12) United States Patent
Shiraki

(10) Patent No.: US 10,651,639 B2
(45) Date of Patent: May 12, 2020

(54) ELECTRICAL JUNCTION BOX PROVIDED WITH RELIEF TERMINAL PORTION

(71) Applicant: SUMITOMO WIRING SYSTEMS, LTD., Mie (JP)

(72) Inventor: Takashi Shiraki, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 0 days.

(21) Appl. No.: 16/323,698

(22) PCT Filed: Aug. 7, 2017

(86) PCT No.: PCT/JP2017/028570
§ 371 (c)(1),
(2) Date: Feb. 6, 2019

(87) PCT Pub. No.: WO2018/030336
PCT Pub. Date: Feb. 15, 2018

(65) Prior Publication Data
US 2019/0356121 A1 Nov. 21, 2019

(30) Foreign Application Priority Data
Aug. 10, 2016 (JP) ................................. 2016-157947

(51) Int. Cl.
H02G 3/16 (2006.01)
H01M 2/20 (2006.01)
(Continued)

(52) U.S. Cl.
CPC ............. *H02G 3/16* (2013.01); *H01M 2/206* (2013.01); *H01M 2/348* (2013.01); *H01R 11/01* (2013.01);
(Continued)

(58) Field of Classification Search
CPC ...... B60R 16/0238; B60R 16/02; H02G 3/16; H02G 3/086; H01H 2085/208; H01H 85/20; H01R 11/24; H01R 11/287
(Continued)

(56) References Cited

U.S. PATENT DOCUMENTS 7,785,116 B2* 8/2010 Akahori ............. B60R 16/0238
439/76.2
8,395,061 B2* 3/2013 Asao ........................ H02G 3/16
174/50

(Continued)

FOREIGN PATENT DOCUMENTS

JP 2002-345126 11/2002
JP 2009-252453 10/2009
(Continued)

OTHER PUBLICATIONS

Official Communication issued in International Bureau of WIPO Patent Application No. PCT/JP2017/028570, dated Aug. 29, 2017.

*Primary Examiner* — Edwin A. Leon
*Assistant Examiner* — Matthew T Dzierzynski
(74) *Attorney, Agent, or Firm* — Greenblum & Bernstein, P.L.C.

(57) ABSTRACT

Provided is an electrical junction box including a relief terminal portion having a structure in which the relief terminal portion can be constituted with a small number of parts and high space efficiency. The electrical junction box includes: a box body; and a power supply distribution bus bar that is disposed in the box body and includes a power supply input terminal portion and power supply branch terminal portions that are connected by a plate-shaped conducting portion. The relief terminal portion is constituted by at least a portion of the plate-shaped conducting portion of the power supply distribution bus bar being disposed in a
(Continued)

state of protruding from the outer surface of the box body and exposed to the outside.

9 Claims, 6 Drawing Sheets

(51) Int. Cl.
    *H01M 2/34*     (2006.01)
    *H01R 11/01*     (2006.01)
    *H01R 11/05*     (2006.01)
    *B60R 16/023*     (2006.01)

(52) U.S. Cl.
    CPC .......... *H01R 11/05* (2013.01); *B60R 16/0238* (2013.01); *H01M 2200/103* (2013.01); *H01M 2220/20* (2013.01); *H01R 2201/26* (2013.01)

(58) Field of Classification Search
    USPC .................................. 439/76.2, 709, 620.27
    See application file for complete search history.

(56) References Cited

U.S. PATENT DOCUMENTS

| | | | |
|---|---|---|---|
| 9,231,330 B2 * | 1/2016 | Tashiro | ............... B60R 16/0238 |
| 9,431,807 B2 * | 8/2016 | Akahori | ............... B60R 16/0238 |
| 9,592,778 B2 * | 3/2017 | Tashiro | ............... B60R 16/0238 |
| 2015/0132978 A1 | 5/2015 | Tashiro et al. | |

FOREIGN PATENT DOCUMENTS

| | | |
|---|---|---|
| JP | 2013-027224 | 2/2013 |
| JP | 2014-027724 | 2/2014 |

\* cited by examiner

ELECTRICAL JUNCTION BOX PROVIDED WITH RELIEF TERMINAL PORTION

TECHNICAL FIELD

The present invention relates to an electrical junction box provided with a relief terminal portion to which a booster cable can be connected at the time of vehicle battery exhaustion.

BACKGROUND ART

Conventionally, a structure has been proposed in which a relief terminal portion to which a booster cable to be used at the time of battery exhaustion can be attached is provided in an electrical junction box such as a relay box that is mounted in an engine room of a vehicle such as a hybrid vehicle having no battery mounted in the vehicle engine room. For example, an electrical junction box such as that disclosed in JP 2009-252453A (Patent Document 1) has been known.

Incidentally, as disclosed in Patent Document 1, in the electrical junction box provided with such a relief terminal portion, a region for providing the relief terminal portion is secured in a portion of the electrical junction box, and a terminal portion protruding from a bus bar, an attachment portion to which the booster cable can be attached, and the like are provided separately in this region to constitute the relief terminal portion.

However, there is a problem in that the dedicated bus bar, the attachment portion, and the like separately provided to constitute the relief terminal portion lead to an increase in the number of parts, which inevitably leads to an increase in cost. Moreover, due to recent demand for smaller size and higher density in vehicles, a case is conceivable in which a region for providing a relief terminal portion cannot be secured in a portion of the electrical junction box. As such, further improvement in a relief terminal portion included in an electrical junction box has been in demand.

CITATION LIST

Patent Document

Patent Document 1: JP 2009-252453A

SUMMARY OF INVENTION

Technical Problem

The present invention has been made in view of the above-described circumstances, and a problem to be solved by the present invention is providing an electrical junction box provided with a relief terminal portion having a new structure with which the relief terminal portion can be constituted by a small number of parts with high space efficiency.

Solution to Problem

A first aspect of the present invention is directed to an electrical junction box provided with a relief terminal portion to which a booster cable can be connected, the electrical junction box including: a box body, and a power supply distribution bus bar that is disposed in the box body and includes a power supply input terminal portion and power supply branch terminal portions that are connected by a plate-shaped conducting portion, and the relief terminal portion is constituted by at least a portion of the plate-shaped conducting portion of the power supply distribution bus bar being provided in a state of protruding from an outer surface of the box body and being exposed to the outside.

According to this aspect, the relief terminal portion is constituted by a portion of the plate-shaped conducting portion of the existing power supply distribution bus bar being provided in a state of protruding from the outer surface of the box body and being exposed to the outside. Accordingly, the relief terminal portion can be provided with use of a portion of an existing bus bar without requiring a terminal portion or an attachment portion dedicated to the relief terminal portion as in a conventional structure. Furthermore, the relief terminal portion can be formed in the region in which the power supply distribution bus bar is originally disposed, and therefore there is no need for securing a dedicated space for the relief terminal portion as in the conventional structure. With this configuration, the relief terminal portion can be constituted with a small number of parts and high space efficiency.

A second aspect of the present invention is directed to the electrical junction box according to the first aspect, wherein a fuse part in which the plate-shaped conducting portion of the power supply distribution bus bar is accommodated in a case is disposed in the box body, and at least a portion of the case of the fuse part is provided protruding from the outer surface of the box body, a portion of the plate-shaped conducting portion is exposed to the outside through an exposure window formed in the case, and the relief terminal portion is constituted by including the case, the exposure window, and the plate-shaped conducting portion.

According to this aspect, the relief terminal portion can be constituted with a simple structure in which the exposure window is formed in a portion of the case of the existing fuse part that is to be attached to the box body, and the relief terminal portion can be constituted more advantageously with use of existing parts and the arrangement space thereof.

A third aspect of the present invention is directed to the electrical junction box according to the second aspect, wherein a cover member for covering the exposure window is attached to the case of the fuse part, and the cover member can be held displacably between a covering position at which the exposure window is covered and an open position at which the exposure window is exposed to the outside.

According to this aspect, when the relief terminal portion is not in use, the cover member is held at the covering position, and thus insulation performance of the fuse part can be stably secured. When using the relief terminal portion, the cover member is held at the open position, and thus a booster cable can be connected to the relief terminal portion while the cover member is held to the case. Accordingly, excellent workability can be achieved, and the risk of losing the cover member can be avoided.

Advantageous Effects of Invention

According to the present invention, the relief terminal portion is constituted by a portion of the plate-shaped conducting portion of the existing power supply distribution bus bar being disposed in the state of protruding from the outer surface of the box body and exposed to the outside. Accordingly, it is possible to provide the relief terminal portion without requiring a terminal portion or an attachment portion dedicated to the relief terminal portion as in the conventional structure. Furthermore, the relief terminal portion can be formed in the region in which the power supply distribution bus bar is disposed, and thus a dedicated space for the relief terminal portion as in the conventional structure need not be secured. Accordingly, it is possible to constitute the relief terminal portion with a small number of parts and high space efficiency.

DESCRIPTION OF EMBODIMENTS

Hereinafter, an embodiment of the present invention will be described with reference to the drawings.

Figure 1:
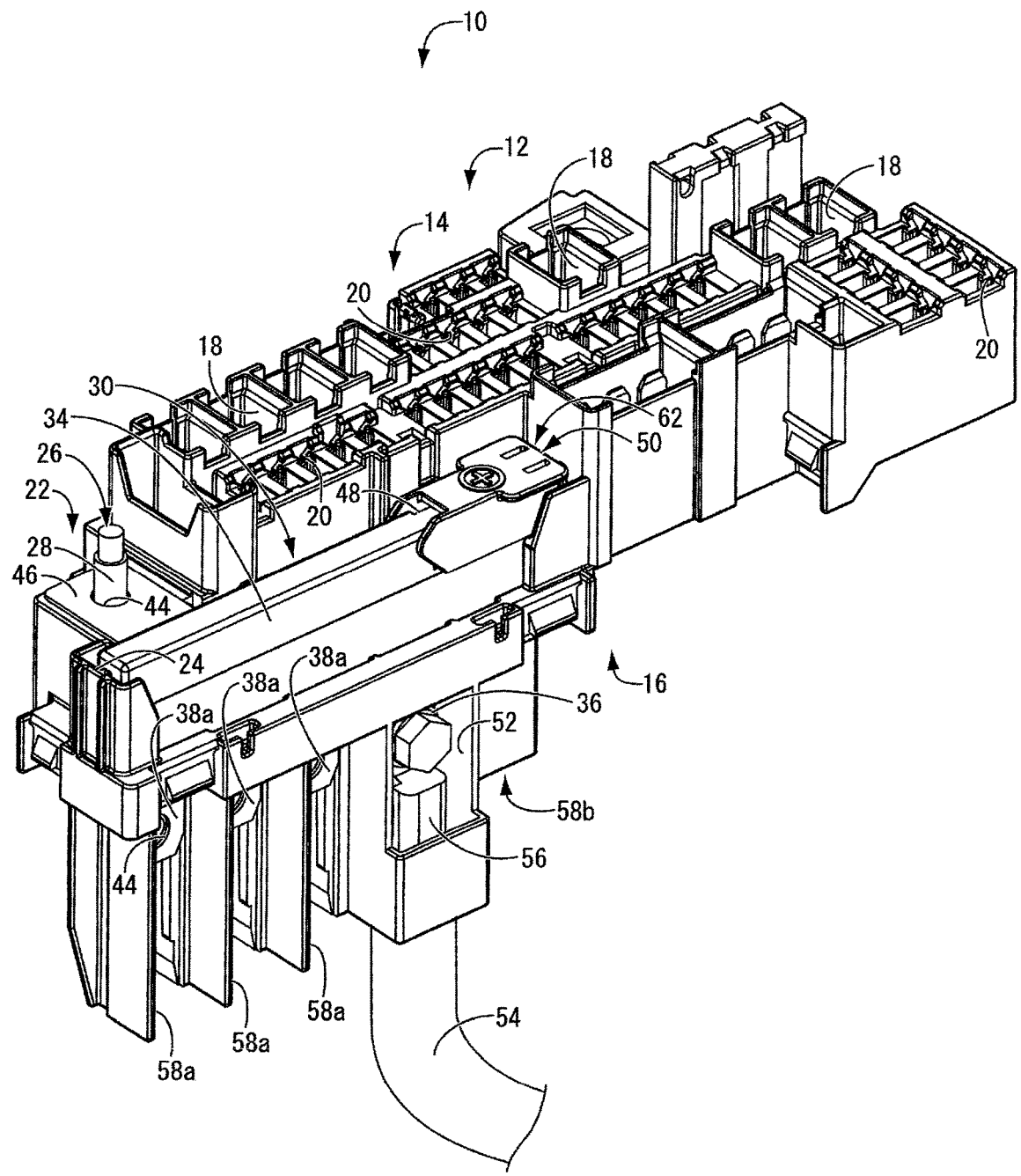
FIG. 1 is a perspective view showing an electrical junction box provided with a relief terminal portion as an embodiment of the present invention.
Figure 2:
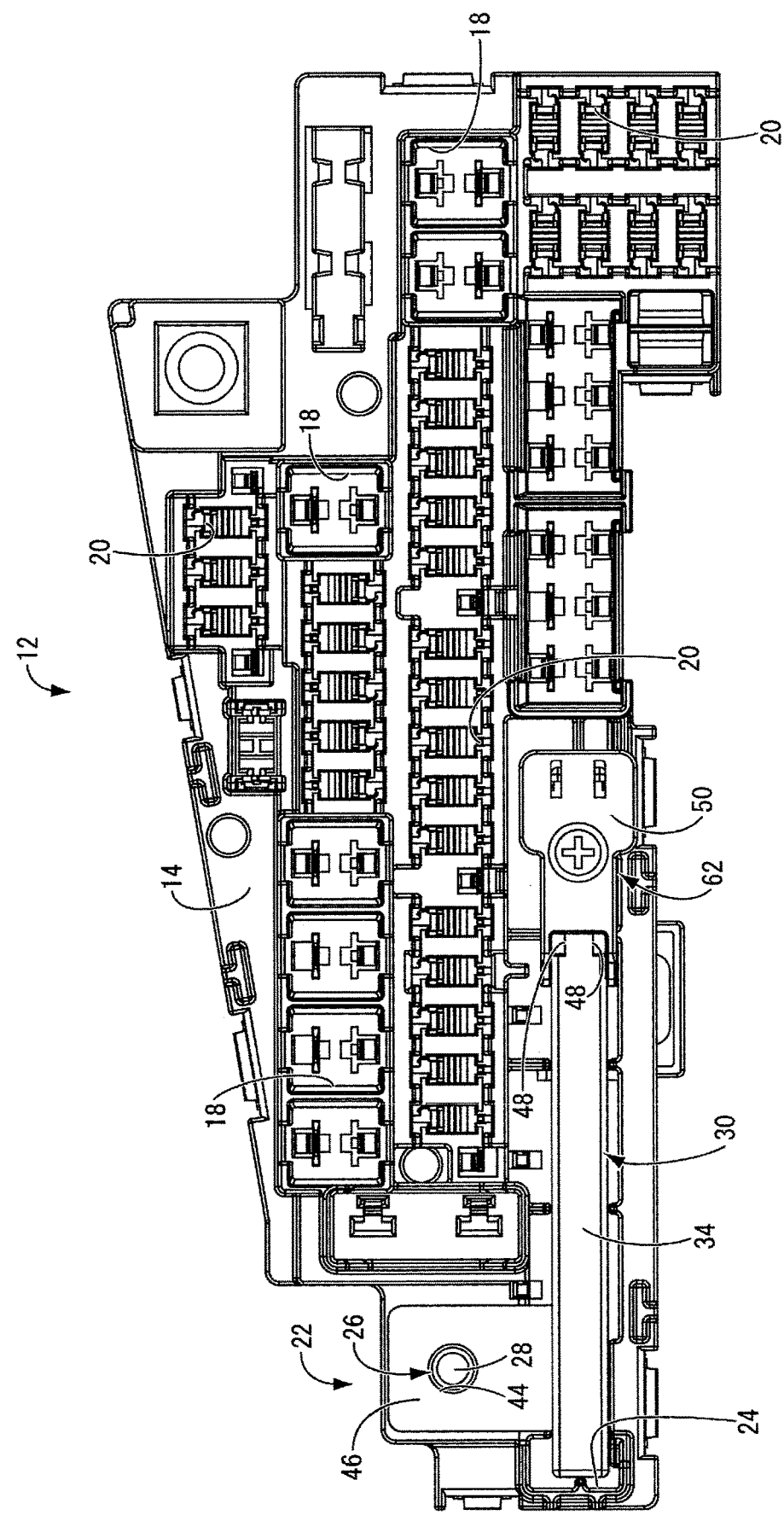
FIG. 2 is a plan view of FIG. 1.

First, FIGS. 1 and 2 show an electrical junction box 10 provided with a relief terminal portion according to an embodiment of the present invention. The electrical junction box 10 is constituted by including a box body 12, and an upper cover and a lower cover (not shown) for respectively covering an upper surface 14 and a lower surface 16, which are part of the outer surface of the box body 12. Note that, in the following description, "upward" refers to upward in FIG. 1, "downward" refers to downward in FIG. 1, "frontward" refers to downward in FIG. 2, and "rearward" refers to upward in FIG. 2, and furthermore, "length direction" refers to the left-right direction in FIG. 2, and "width direction" refers to the up-down direction in FIG. 2.

The box body 12 has an elongated rectangular block shape as a whole, and is formed in one piece through injection molding or the like using an insulating synthetic resin such as polypropylene (PP) or polyamide (PA). A large number of relay attachment portions 18 and fuse attachment portions 20 are formed open upward at the center and on the rear side in the length direction (left-right direction in FIG. 2) of the upper surface 14 of the box body 12. When the relays and fuses (not shown) are attached to such relay attachment portions 18 and fuse attachment portions 20 from the upper surface 14 side of the box body 12, tab terminals protruding from the relays and fuses are accommodated in terminal accommodating holes (not shown) formed open downward in the lower surface 16 of the box body 12. Although not shown, for example, crimped terminals crimped on the end of wires that are conductively connected to an external electric device, an external electrical circuit, and the like, are accommodated and arranged in such terminal accommodating holes, and a bus bar and the like that form the electrical circuit are mounted and supported in bus bar accommodating grooves and the like, and thus the crimped terminals provided on the ends of the wires, the bus bars, and the like are conductively connected to the tab terminals accommodated and arranged in the terminal accommodating holes.

On the front side (left side in FIG. 2) in the length direction of the upper surface 14 of the box body 12, a terminal attachment portion 22 is formed on the far side, while a fuse part attachment portion 24 is formed open upward on the near side. More specifically, the terminal attachment portion 22 includes a stud bolt 26 disposed protruding from the upper surface 14 of the box body 12 in a state in which the not-shown head portion is fitted into a not-shown bolt accommodating hole. An alternator connection terminal portion 46 for a later-described fuse part 30 is fastened to an upper end portion 28 of the stud bolt 26 protruding from the upper surface 14, with a not-shown bolt. Note that, although not shown, an alternator power supply terminal for charging the battery is conductively connected, via a wire, to the lower end portion of the stud bolt 26 protruding downward from the lower surface 16.

Figure 3:
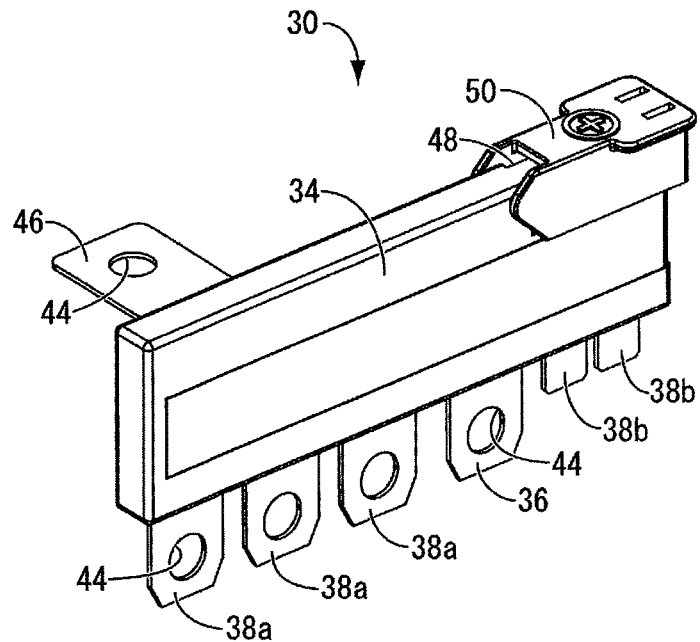
FIG. 3 is a perspective view of a fuse part shown in FIG. 1, showing a state in which a cover member is held at a covering position.
Figure 4:
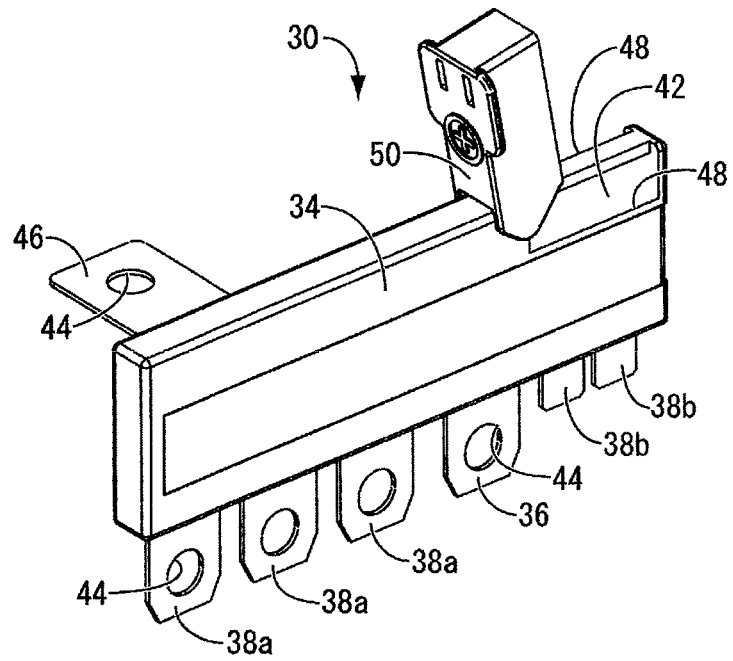
FIG. 4 is a perspective view showing a state in which the cover member shown in FIG. 3 is held at an open position.
Figure 5:
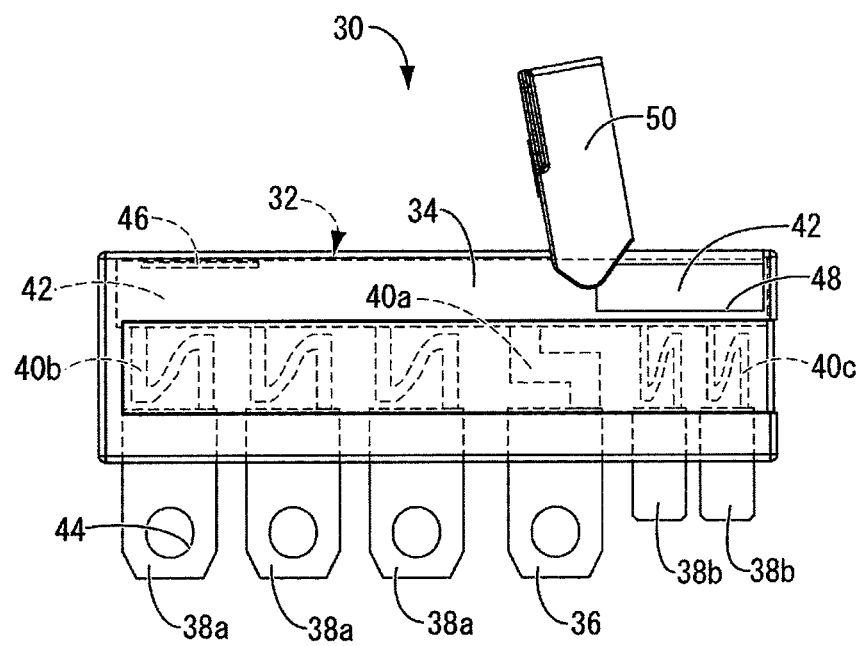
FIG. 5 is a right-side view of FIG. 4.

Also, as shown in FIGS. 1 and 2, the fuse part 30 is attached to the fuse part attachment portion 24 provided on the box body 12 from the upper surface 14 side of the box body 12. As shown in FIGS. 3 to 5, the fuse part 30 is constituted by including a power supply distribution bus bar 32 and a case 34 for accommodating the power supply distribution bus bar 32. For ease of understanding, the portion of the power supply distribution bus bar 32 that is accommodated in the case 34 is indicated by dotted lines only in FIG. 5. More specifically, as shown in FIG. 5, the power supply distribution bus bar 32 is formed by press-punching a conductive metal plate, and has a structure in which a power supply input terminal portion 36 and power supply branch terminal portions 38a and 38b are connected a the plate-shaped conducting portion 42 via fusion portions 40a, 40b, and 40c. Here, the plate-shaped conducting portion 42 is a plate having an approximately horizontal rectangular-shape in a side view that extends over substantially the entire length in the length direction (left-right direction in FIG. 5) of the power supply distribution bus bar 32 on the upper end side of the power supply distribution bus bar 32. On the other hand, the power supply input terminal portion 36 is a plate that has approximately rectangular shape in a side view, includes a bolt insertion hole 44, and protrudes downward via the fusion portion 40a that is a thin member extending from the lower end portion of the plate-shaped conducting portion 42 in an approximately crank shape. Furthermore, the power supply branch terminal portions 38a are approximately rectangular plates in a side view, each having a bolt insertion hole 44 and protruding downward via the fusion portion 40b that is a thin member whose width is narrower than the fusion portion 40a, and that extends from the lower end portion of the plate-shaped conducting portion 42 in an approximately inverted N shape. Furthermore, the power supply branch terminal portions 38b are approximately rectangular plates in a side view, each protruding downward via the fusion portion 40c that is a thin member whose width is narrower than the fusion portion 40b, and that extends from the lower end portion of the plate-shaped conducting portion 42 in an approximately inverted N shape. In addition, as shown in FIGS. 3 to 5, the plate-shaped conducting portion 42 is provided with the alternator connection terminal portion 46 that has an approximately rectangular plate shape in a plan view, includes a bolt insertion hole 44, and protrudes outward (far side in FIGS. 3 to 5) from the upper end portion of the front-end side (left side in FIG. 5) of the plate-shaped conducting portion 42.

As shown in FIGS. 3 to 5, the fuse part 30 is constituted by the case 34 accommodating the plate-shaped conducting portion 42 and the fusion portions 40a, 40b, and 40c that constitute the power supply distribution bus bar 32, while the power supply branch terminal portions 38a and 38b and the alternator connection terminal portion 46 that constitute the power supply distribution bus bar 32 mostly protrude outward from the inside of the case 34. The case 34 is formed of an insulating transparent synthetic resin such as an acrylic resin, for example, through mold injecting or the like, such that the state of the fusion portions 40a, 40b, and 40c, namely whether or not they are melted, can be easily checked visually from the outside. More specifically, the case 34 is constituted from two cases having a shallow box shape in a side view, for example, and the two cases are assembled together by a locking mechanism (not shown) in a state in which the two cases are arranged such that the openings thereof oppose each other with respect to the width direction (direction perpendicular to the paper surface in FIG. 5).

In addition, as shown in FIGS. 3 to 5, an exposure window 48 through which a portion of the plate-shaped conducting portion 42 is exposed to the outside is formed by cutting out portions on the two sides in the width direction (a direction perpendicular to the paper surface in FIG. 5) of the upper end portion on the rear end side (right side in FIG. 5) of the case 34, into an approximate horizontally long rectangular shape in a side view. Furthermore, a cover member 50 for covering the exposure window 48 is attached to the case 34. More specifically, the cover member 50 has an approximately rectangular box shape, is open downward and forward at a covering position shown in FIG. 3, and is hingedly connected to the case 34 via a hinge mechanism (not shown) provided at the front-side opening portion. With this structure, the cover member 50 can be held to the case 34 displacably between the covering position (see FIG. 3) at which the exposure window 48 is closed and an open position (see FIGS. 4 and 5) at which the exposure window 48 is exposed to the outside. Note that, at the covering position shown in FIG. 3, the width of the upper end portion on the rear end side of the cover member 50 is increased toward two sides in the width direction so as to facilitate gripping when opening/closing the cover member 50.

As shown in FIG. 1, the fuse part 30 having the above-described configuration is attached to the fuse part attachment portion 24 provided on the box body 12 from the upper surface 14 side of the box body 12. After the fuse part 30 is attached, the alternator connection terminal portion 46 having the bolt insertion hole 44 that is arranged for the insertion is fastened, with a bolt, to the upper end portion 28 of the stud bolt 26 of the terminal attachment portion 22, and a connection portion of the crimped terminal 56 formed at the end of the wire 54 that is conductively connected to the power supply terminal of the battery (not shown) is conductively connected, with a bolt, to the power supply input terminal portion 36 accommodated in a power supply input terminal accommodation portion 52 that protrudes from the lower surface 16 of the box body 12 and is open downward and frontward. Accordingly, the power supply terminal of the battery is conductively connected to the power supply terminal of the alternator via the fuse part 30, and therefore the battery can be charged through the alternator. In addition, power can be distributed to the power supply branch terminal portion 38a accommodated in a power supply branch terminal accommodation portion 58a that protrudes from the lower surface 16 of the box body 12 and is open downward and frontward by, for example, conductive connection to another electrical junction box via a wire or the like. Furthermore, power can also be distributed to the power supply branch terminal portion 38b accommodated in a power supply branch terminal accommodation portion 58b that protrudes from the lower surface 16 of the box body 12 and is open downward and frontward by, for example, being fitted to a connecter provided at the end of a wire conductively connected to another electrical junction box. Finally, the upper surface 14 and the lower surface 16 of the box body 12 are covered with an upper cover and a lower cover (not shown), respectively, and thus the electrical junction box 10 of the present embodiment is complete.

Figure 6:
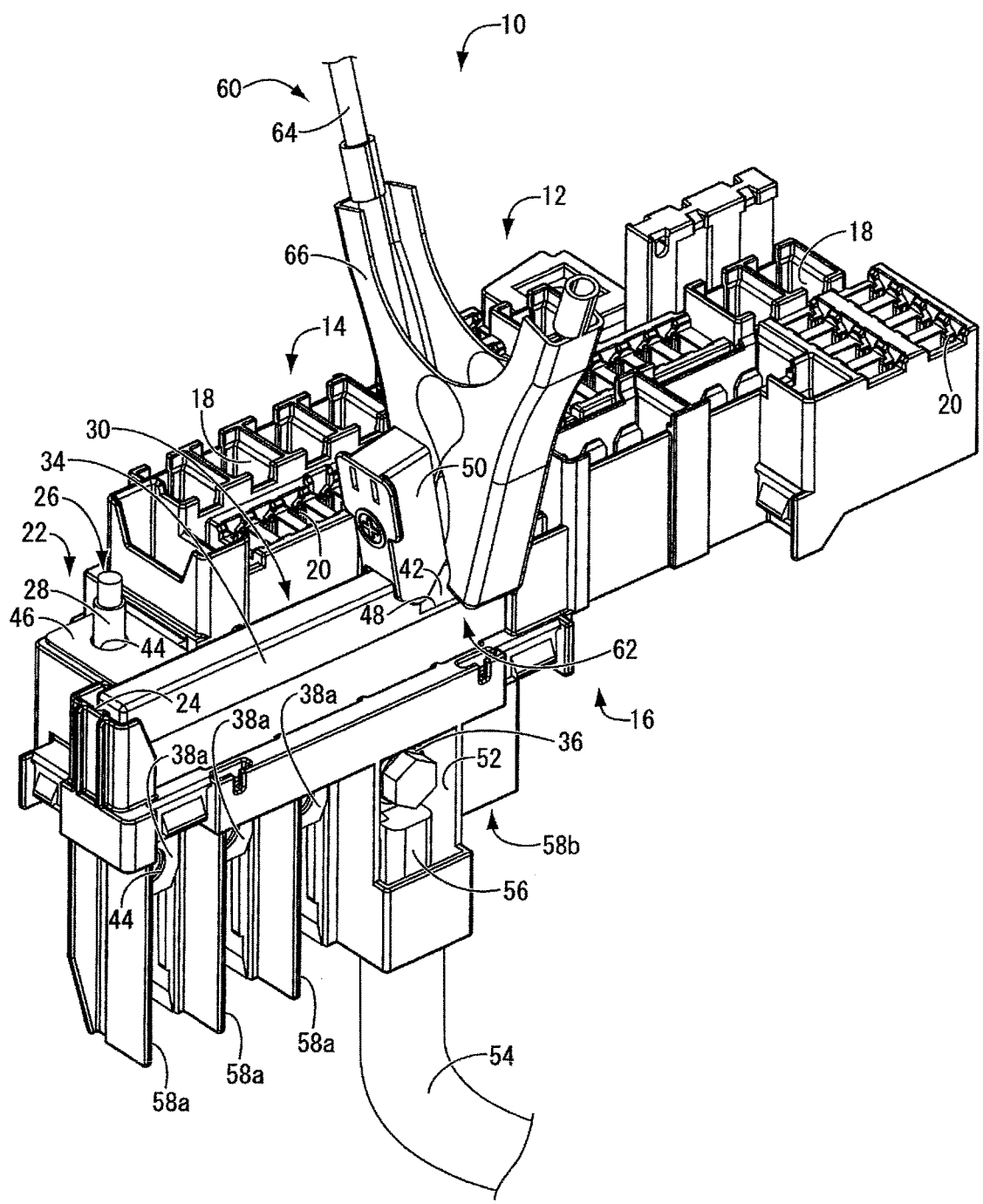
FIG. 6 is a perspective view showing a state in which a booster cable is connected to the relief terminal portion of the electrical junction box shown in FIG. 1.

As shown in FIG. 6, the electrical junction box 10 of the present embodiment is provided with a relief terminal portion 62 to which a booster cable 60 can be connected. Here, a portion of the plate-shaped conducting portion 42 of the power supply distribution bus bar 32 is exposed to the outside through the exposure window 48 by the cover member 50 attached to the fuse part 30 being held at the open position. Furthermore, in the present embodiment, the fuse part 30 is arranged on and attached to the fuse part attachment portion 24 in a state of protruding from the upper surface 14 of the box body 12, due to the fact that a portion of the plate-shaped conducting portion 42 exposed to the outside through the exposure window 48 needs to be held by a clip portion 66 made of conductive metal, which closes with the force of a spring and is connected to the leading end of a wire 64 forming the booster cable 60. In short, the relief terminal portion 62 is constituted by including the case 34, the exposure window 48, and the plate-shaped conducting portion 42, with a portion of the plate-shaped conducting portion 42 of the power supply distribution bus bar 32 being exposed to the outside through the exposure window 48 and protruding from the upper surface 14 of the case body 12.

According to the electrical junction box 10 with this structure, the relief terminal portion 62 is constituted by arranging a portion of the plate-shaped conducting portion 42 of the power supply distribution bus bar 32 of the fuse part 30 in the state of being exposed to the outside and protruding from the upper surface 14 of the box body 12, with use of an existing fuse part, for example. For this reason, a terminal portion and an attachment portion dedicated to the relief terminal portion as in the conventional technique are not required. Furthermore, the configuration of the power supply distribution bus bar 32 itself that constitutes the relief terminal portion 62 is not changed, and therefore a space dedicated to the relief terminal portion as in the conventional technique need not be secured. Accordingly, the relief terminal portion 62 can be constituted with a small number of parts and high space efficiency.

Furthermore, it is possible to constitute the relief terminal portion 62 with a simple structure in which the exposure window 48 is formed in a portion of the case 34 of the fuse part 30 with use of the existing fuse part. As such, when the relief terminal portion 62 is not in use, the exposure window 48 formed in a portion of the case 34 of the fuse part 30 is covered by holding the cover member 50 at the covering position, and thus the insulation performance can be stably ensured. On the other hand, when using the relief terminal portion 62, the clip portion 66 of the booster cable 60 can be conductively connected to the plate-shaped conducting portion 42 exposed to the outside through the exposure window 48 in the relief terminal portion 62 by holding the cover member 50 at the open position. Accordingly, it is possible to ensure excellent workability and avoid the risk of losing the cover member 50.

Figure 7:
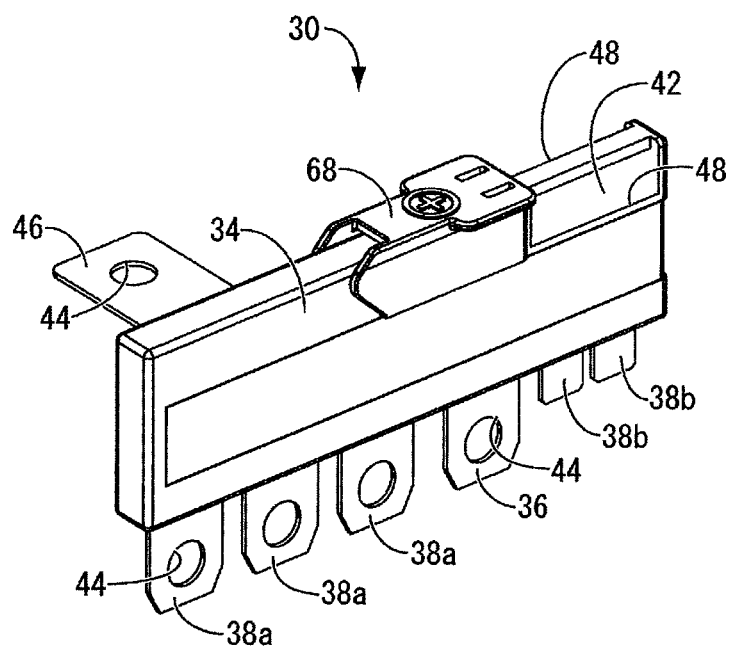
FIG. 7 is a perspective view showing another aspect in a state in which the cover member is held at the open position, and is a view corresponding to FIG. 4.

Although an embodiment of the present invention has been described above in detail, the invention is not intended to be limited by the specific description thereof. For example, in the above-described embodiment, the relief terminal portion 62 can be constituted by forming the exposure window 48 in a portion of the case 34 of the fuse part 30. However, a configuration is also possible in which the relief terminal portion 62 is constituted by a portion of the plate-shaped conducting portion 42 in the case 34 protruding outward, for example upward, from the case 34, thereby being exposed. Furthermore, although a portion of the plate-shaped conducting portion 42 is exposed to the outside in the above-described embodiment, the entirety or most of the plate-shaped conducting portion 42 may be exposed to the outside. In addition, although the exposure window 48 is opened and closed by the cover member 50 that covers the exposure window 48 and is hingedly connected to the case 34 in the above embodiment, the exposure window 48 may be opened and closed by sliding a cover member 68 with respect to the case 34 (see FIG. 7).

LIST OF REFERENCE NUMERALS

10: Electrical junction box
12: Box body
14: Upper surface (outer surface)
30: Fuse part
32: Power supply distribution bus bar
34: Case
36: Power supply input terminal portion
38a, 38b: Power supply branch terminal portion
42: Plate-shaped conducting portion
48: Exposure window
50, 68: Cover member
60: Booster cable
62: Relief terminal portion

The invention claimed is:

1. An electrical junction box provided with a relief terminal to which a booster cable can be connected, the electrical junction box comprising:
a box body, and
a power supply distribution bus bar that is disposed in the box body and includes power supply input terminal and power supply branch terminals that are connected by a plate-shaped conductor,
wherein the relief terminal is coplanar with the plate-shaped conductor and is constituted by at least a portion of the plate-shaped conductor of the power supply distribution bus bar which protrudes from an outer surface of the box body and is exposed to an outside,
wherein a fuse formed by accommodating the plate-shaped conductor of the power supply distribution bus bar in a case is disposed in the box body, and
at least a portion of the case of the fuse protrudes from the outer surface of the box body, and the portion of the plate-shaped conductor constituting the relief terminal is exposed to the outside through an exposure window formed in the case.

2. The electrical junction box provided with the relief terminal according to claim 1, wherein a cover to cover the exposure window is attached to the case of the fuse, and the cover is movable between a covering position at which the exposure window is covered and an open position at which the exposure window is exposed to the outside.

3. The electrical junction box provided with the relief terminal according to claim 1,
wherein the power supply input terminal and the power supply branch terminals each project outwardly from a same surface of the plate-shaped conductor.

4. The electrical junction box provided with the relief terminal according to claim 1,
wherein the relief terminal is disposed at a first side of the plate-shaped conductor, and
the power supply input terminal and the power supply branch terminals are disposed at a second side of the plate-shaped conductor that is opposite to the first side.

5. The electrical junction box provided with the relief terminal according to claim 1,
wherein the power supply input terminal and the power supply branch terminals are coplanar with the plate-shaped conductor.

6. The electrical junction box provided with the relief terminal according to claim 1, further comprising an alternator connection terminal that is connected to the plate-shaped conductor, and the alternator connection terminal and the plate-shaped conductor are noncoplanar with one another.

7. An electrical junction box provided with a relief terminal to which a booster cable can be connected, the electrical junction box comprising:
a box body, and
a power supply distribution bus bar that is disposed in the box body and includes power supply input terminal and power supply branch terminals that are connected by a plate-shaped conductor,
wherein the relief terminal is coplanar with the plate-shaped conductor and is constituted by at least a portion of the plate-shaped conductor of the power supply distribution bus bar which protrudes from an outer surface of the box body and is exposed to an outside, and
wherein the power supply distribution bus bar includes a plurality of fuse structures that are meltable and that are respectively disposed between the plate-shaped conductor and each of the power supply input terminal and the power supply branch terminals.

8. The electrical junction box provided with the relief terminal according to claim 7, wherein at least one of the plurality of fuse structures includes an approximately inverted N shape.

9. The electrical junction box provided with the relief terminal according to claim 7, wherein at least one of the plurality of fuse structures that is disposed between the plate-shaped conductor and at least one of the power supply branch terminals includes a narrower width than that of a fuse structure of the plurality of fuse structures that is disposed between the plate-shaped conductor and the power supply input terminal.

* * * * *